Oct. 11, 1938.   R. R. STEVENS   2,132,977
CONTROL SWITCH FOR AUTOMATIC COUPLERS
Filed Jan. 26, 1937   2 Sheets-Sheet 1

INVENTOR
ROY R. STEVENS
BY Wm. H. Cady
ATTORNEY

Oct. 11, 1938.        R. R. STEVENS        2,132,977
CONTROL SWITCH FOR AUTOMATIC COUPLERS
Filed Jan. 26, 1937        2 Sheets-Sheet 2
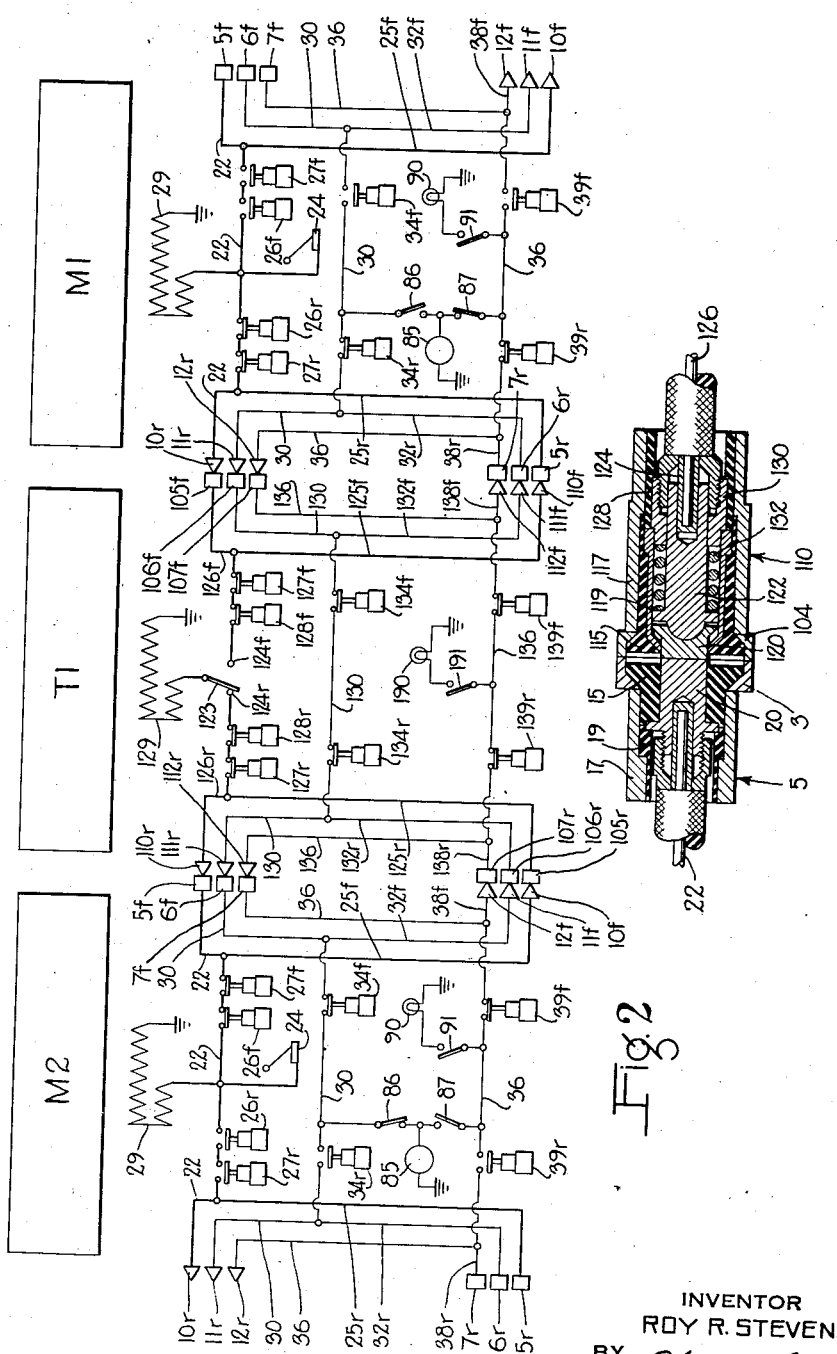
INVENTOR
ROY R. STEVENS
BY *Wm. N. Cady*
ATTORNEY Patented Oct. 11, 1938

2,132,977

UNITED STATES PATENT OFFICE 2,132,977

CONTROL SWITCH FOR AUTOMATIC COUPLERS

Roy R. Stevens, Forest Hills, Pa., assignor to The Westinghouse Air Brake Company, Wilmerding, Pa., a corporation of Pennsylvania Application January 26, 1937, Serial No. 122,399

9 Claims. (Cl. 173—332)

This invention relates to a car coupling system and particularly to a car coupling system in which there are contacts associated with the car couplers and adapted to establish electric circuits between the cars of a train.

The vehicle equipment of some electric railways includes power or motor cars which are equipped with driving motors and control equipment therefore, as well as means to collect current from a suitable conductor, such as a trolley wire or third rail.

The vehicle equipment of these railways also includes trailer or auxiliary cars which are not provided with driving motors, but are intended to be drawn by the motor cars.

These trailer or auxiliary cars are equipped with electrical heating means, and as they do not have current collecting means, it is necessary to supply these cars with current from the motor or power cars.

In addition, the trailer cars are provided with electric lights which must be supplied with current from the motor cars, while both the motor and trailer cars have control wires mounted thereon to carry current throughout the train for use in controlling the driving motors on the motor cars.

Some cars of this type are equipped with automatic couplers having electric portions incorporating contact carrying slides which are projected into engagement with the corresponding slides of counter-part couplers immediately after the cars are coupled together in order to establish circuits throughout the train.

The circuits which supply the heating and lighting units on the trailer cars, and the control circuits, carry relatively heavy currents, and it is desirable that these circuits be established through contacts associated with the couplers, but not incorporated in the electric portions of the couplers. It is also desirable that these contacts automatically engage when the couplers are connected together so that the circuits controlled thereby will be automatically completed without special attention from the trainmen.

As these circuits carry relatively heavy currents, it is desirable that the supply of current to the contacts associated with these circuits be interrupted before the contacts are separated, and that the supply be not reestablished until after the contacts are firmly engaged.

As these contacts are exposed when a coupler is not coupled to another coupler, it is desirable also that the contacts be deenergized when the coupler is not coupled to another coupler in order to prevent injury to workmen or others who might touch these contacts.

It is an object of this invention to provide car coupling means of the type described having contacts which are adapted to engage when the couplers are coupled together, together with means inter-connected with the coupler mechanism and operative only after the couplers are coupled together to supply current to these contacts, this means also being operative to interrupt the supply of current to these contacts before the couplers are uncoupled.

A further object of the invention is to provide car coupling means of the type described, and which requires a minimum of alteration in the couplers now provided for this class of service.

Other objects of the invention and features of novelty will be apparent from the following description taken in connection with the accompanying drawings, in which Fig. 1 is a diagrammatic view, partly in section, of a pair of couplers and associated apparatus embodying this invention, Fig. 2 is an enlarged sectional view taken substantially along the line 2—2 on Fig. 1, and showing the contacts employed in connection with the couplers shown in Fig. 1, and Fig. 3 is a diagram of certain of the circuit connections established in a train of cars equipped with the car coupling system provided by this invention.

Referring to Fig. 1 of the drawings there is illustrated therein a pair of couplers having associated therewith contacts and circuit control means embodying this invention. The equipment shown in this figure of the drawings includes a coupler and the associated apparatus for a motor or power car, and a coupler and associated apparatus for a trailer or auxiliary car. The equipment for these cars is substantially identical, and the couplers are counter-part couplers, and any two couplers may be coupled together whether they are a coupler for a motor car and an auxiliary car, as shown in the drawings, or are two couplers for motor cars, or two couplers for trailer cars.

The equipment shown in Fig. 1 of the drawings comprises a coupler, indicated generally by the reference numeral 1, for a motor car, and a coupler, indicated generally by the reference numeral 101, for a trailer car. These couplers are of the type shown in U. S. Patent No. 1,571,222 to H. F. Woernley, and each of these couplers has an electric portion, not shown, incorporating a contact carrying slide which is retracted when the coupler is not coupled to another coupler, while a spring is provided for projecting the slide outwardly. A latch or trigger prevents movement of the slide by the spring until the couplers are firmly engaged, at which time fluid under pressure is supplied to chambers at the faces of trigger release pistons in each of the couplers, which release the triggers and permit the springs to move the contact carrying slides outwardly into engagement with each other.

These couplers also have mechanism incorporated therein and operated on the supply of fluid under pressure to retract the contact carrying slides, and to thereafter release the couplers and permit the cars to be separated, while the supply of fluid under pressure to the chambers at the faces of the trigger release pistons is cut off, and fluid is released therefrom when the couplers are separated so that the triggers are permitted to maintain the contact carrying slides in their retracted position.

Each of the couplers has associated therewith a manually operated uncoupling valve for supplying fluid under pressure to the slide retracting mechanism and the coupler releasing mechanism, while the couplers are constructed so that on the supply of fluid under pressure by the uncoupling valve on either coupler, fluid flows to the connected coupler to operate the mechanism incorporated therein.

The coupler 1 has associated therewith an uncoupling valve indicated generally by the reference numeral 2, while the coupler 101 has an uncoupling valve 102 associated therewith. The uncoupling valves 2 and 102 correspond to the valve indicated at 43 in the above identified patent.

The couplers 1 and 101 differ from those shown in the above identified U. S. Patent No. 1,571,222 to H. F. Woernley in that the bodies of the couplers have brackets formed thereon which carry contacts which are adapted to engage cooperating contacts on the connected coupler. These brackets extend from each side of the coupler, and each bracket carries three contacts.

The bracket 3 on one side of the coupler 1 carries contacts 5, 6 and 7, which are of the stationary type, while the bracket 4 on the other side of the coupler 1 carries contacts 10, 11 and 12, which are of the movable type.

The bracket 103 on one side of the coupler 101 carries contacts 105, 106 and 107, which are of the stationary type, and are adapted to engage the movable contacts 10, 11 and 12 on the coupler 1 when the couplers are coupled together. The bracket 104 on the other side of the coupler 101 carries contacts 110, 111 and 112, which are of the movable type, and are adapted to engage the stationary contacts 5, 6 and 7 on the coupler 1.

The contacts on the couplers 1 and 101 are of similar construction. One form of construction which may be employed is shown in Fig. 2 of the drawings, which shows a contact of the stationary type and a contact of the movable type.

The bracket 3 has an opening extending therethrough in which is mounted a bushing 15, formed of a suitable insulating material and having a cylindrical portion on which is mounted a tubular member 17, in which is positioned an insulating sleeve 19. A contact 20 is mounted in a bore in the bushing 15 and has a flange thereon which is clamped between the bushing 15 and the sleeve 19. The contact 20 has a bore therein in which is secured, in any suitable manner, the end of a wire 22 which may be covered with suitable insulation and is a part of a circuit to be controlled.

The end of the contact 20 is exposed on the face of the coupler 1 adjacent the coupler 101, and extends substantially to the plane intermediate the couplers 1 and 101 when the couplers are connected together.

The movable contact 110 is secured on the bracket 104 formed on the coupler 101. The bracket 104 has a bore therein in which is mounted a bushing 115, which may be formed of a suitable insulating material, and which has a tubular portion on which is mounted a tubular member 117, while the bushing 115 has secured therein a tubular sleeve 119 which terminates at one end in a conical portion.

The sleeve 119 has a bore therein in which is reciprocable a contact 120, which extends through a bore in the end of the sleeve 119 and is adapted to engage the face of the contact 20 of the stationary contact 5.

The sleeve 119 also has mounted therein a metallic stem 122 having a rounded end portion which extends into a concave socket in the contact 120. The stem 122 has slidably mounted in a bore therein a rod 124 formed of electrically conducting material, and having secured thereto in a suitable manner a wire 126.

The tubular member 117 has an insulating bushing 128 secured therein, while a member 130 is secured in the bushing 128 and has a bore therein through which the stem 122 extends. A coil spring 132 extends between the member 130 and a flange on the stem 122 and yieldingly urges the stem 122 and the contact 120 to the left, as viewed in the drawings, until further movement of the contact 120 is prevented by engagement with the end of the sleeve 119, or by engagement of the movable contact 120 with the stationary contact 20 on a connected coupler.

The contacts on the couplers are arranged so that the stationary contacts on the couplers will be engaged by the movable contacts on the connected coupler regardless of the types of car on which the couplers are mounted, while the movable contacts on the couplers will engage the stationary contacts on the connected coupler.

The wire 22 leading from the stationary contact 5 on the coupler 1 is connected to current collecting means, such as the trolley indicated at 24, on the motor car, as shown in Fig. 3 of the drawings, and is connected by way of a branch wire 25 with the movable contact 10. The wire 22 has a pair of pneumatically operated switches, indicated at 26 and 27, interposed therein.

The pneumatic switches 26 and 27 are of similar construction, as are the pneumatic switches employed at other points in this equipment and, as shown, comprise casings having bores therein in which are mounted pistons subject on one side to the pressure of the fluid in a chamber, and subject on the other side to the force exerted by a spring. These pistons have stems to which are secured movable contacts adapted to bridge stationary contacts to complete a circuit through the wires controlled thereby. The pistons are normally held by the springs in the position in which the movable contacts do not engage the stationary contacts associated therewith, and on the supply of fluid under pressure to the chambers at the faces of the pistons, the pistons are moved against the springs associated therewith and move the movable contacts to their closed positions.

The wire 22 supplies the heating unit on the trailer car and carries a relatively heavy current at a relatively high voltage, and two switches are provided in this circuit in order to insure that the circuit will be interrupted, and in order to reduce the load on the switches.

The stationary contact 6 has the control wire 30 connected thereto, and is connected by way of a wire 32 with the movable contact 11. The wire 30 has a pneumatic switch indicated at 34 interposed therein to control the flow of current therethrough.

The stationary contact 7 on the coupler 1 has the light wire 36 connected thereto, and is connected by way of a wire 38 with the movable contact 12. The wire 36 has a pneumatic switch 39 interposed therein to control the circuit therethrough.

The coupler 1 has associated therewith a valve device indicated generally by the reference numeral 40 for controlling the supply of fluid under pressure from the chamber at the face of the trigger release piston, not shown, in the coupler 1 to the pneumatic switches 26, 27, 34 and 39. In addition, valve means indicated by the reference numeral 42 is provided to control the supply of fluid by the valve device 40 to these switches, and to also control the release of fluid from these switches.

As shown in the drawings, the valve device 40 comprises a body having a bore therein in which is mounted a piston 44 having at one side thereof a chamber 45, which is constantly connected to the atmosphere by way of a restricted passage 47, while this chamber is constantly connected with the uncoupling valve device 2 by way of a pipe 48.

The piston 44 has at the other side thereof a chamber 50 which is constantly connected to the atmosphere by way of a passage 51, while a sealing gasket having an annular seat rib 52 thereon of somewhat smaller diameter than the piston is mounted in the body of the valve device 40 adjacent the end of the bore in which the piston 44 is mounted. The seat rib 52 is adapted to be engaged by a face of the piston 44.

The body of the valve device 40 has a chamber 53 therein which is constantly connected by way of a passage and pipe 54 with the valve means 42, while a double beat valve 55 is mounted in the chamber 53.

The body of the valve device 40 has, in addition, a chamber 57 therein, which is constantly connected by way of a passage and pipe 58 with the pipe, not shown, through which fluid under pressure is supplied to the chamber at the face of the trigger release piston, not shown, in the coupler 1. This pipe is identified by the reference numeral 10 in the above identified patent to H. F. Woernley.

The chamber 57 has a spring 59 mounted therein and yieldingly urging the double beat valve 55 to the lower seated position to permit communication between the chamber 57 and the chamber 53, and to cut off communication between the chamber 53 and the chamber 50, which is connected to the atmosphere by way of the passage 51.

The piston 44 has a bore in the stem thereof into which extends the end of the stem of the double beat valve 55. A spring 60 extends between the end of the stem of the valve 55 and a plug 61, and on upward movement of the piston 44 force is transmitted through the spring 60 to move the double beat valve 55 against the spring 59 from its lower seated position to its upper seated position to cut off communication between the chamber 57 and the chamber 53, and to open communication between the chamber 53 and the chamber 50.

The valve means 42 comprises a body having a chamber 63 therein to which is connected the pipe 54 leading from the valve device 40, while the body has a bore therein in which is mounted a valve piston 64, which is yieldingly urged by means of a spring 65 into engagement with a seat rib 66 surrounding a passage leading from the chamber 63. The seat rib 66 is of somewhat smaller diameter than the valve piston 64, while the valve piston has at the face thereof a chamber 68, which is connected by way of a passage 69 with the chamber 70 at the spring side of the valve piston when the valve piston is in engagement with the seat rib 66. The valve piston 64 has an annular seat rib 71 formed thereon which is adapted to engage a sealing gasket 72 carried by a cover 73. The cover 73 has a passage 74 extending therethrough and communicating with the chamber 70 at a point inwardly of the seat rib 71 on the valve piston 64. The passage 69 is connected by way of a branched pipe 76 with the pneumatic switches 26 and 27, 34 and 39.

The uncoupling valve device 2 may be of any suitable well known construction, and as shown comprises a body having a plug valve 77 therein which is movable between spaced positions by means of a handle 78. The plug valve 77 has a passage 79 therein adapted to establish communication between a pipe 80 leading from a reservoir 81, and the pipe 48 leading to the valve device 52, while a branch pipe 82, having a check valve 83 interposed therein, leads from the pipe 48 to the slide retracting mechanism and the release mechanism in the coupler 1.

The apparatus associated with the coupler 101 is similar to that associated with the coupler 1. The movable contact 116 of the coupler 101 has a wire 126 connected thereto, while this wire is connected, as shown in Fig. 3 of the drawings, to a contact 124 which is adapted to be engaged by a switch blade 123 to establish a circuit through the heating unit 129 on the trailer car. The wire 126 has pneumatic switches 127 and 128 interposed therein, while this wire is connected by way of a wire 125 with the stationary contact 105.

The movable contact 111 has the portion 130 of the control wire on the trailer car connected thereto, while this wire is connected by way of a wire 132 with the stationary contact 106.

The movable contact 112 has the light wire 136 connected thereto, while this wire is connected by way of a wire 138 with the stationary contact 107.

The control wire 130 on the trailer car has a pneumatic switch 134 interposed therein to control the circuit therethrough, while the light wire 136 on the trailer car has a pneumatic switch 139 interposed therein.

The coupler 101 for a trailer car also has associated therewith an uncoupling valve device 102, a valve device 140, and valve means 142, which are similar in construction and operation to the corresponding apparatus associated with the coupler 1, and need not be described in detail.

The equipment on each end of a motor or trailer car is substantially the same as the equipment on the other end of the same car. In the diagram shown in Fig. 3 of the drawings the train comprising motor cars M1 and M2, and a trailer car T1, is assumed to be traveling from left to right, as viewed in the drawings, and the reference numerals for the equipment at the right hand ends of the cars is followed by the suffix *f*, while the reference numerals for the equipment at the left hand ends of the cars is followed by the suffix *r*.

Referring to Fig. 3 of the drawings, each of the motor cars is provided with a dynamotor 85 which is driven by current supplied by the trolley 24 on this car. One terminal of each of the dynamotors is grounded, while the other terminal is adapted to be connected by means of a switch 86 with the portion of the control wire 30 on the motor car, and is also adapted to be connected by means of a switch 87 with the portion of the light wire 36 on the motor car.

Each of the motor cars is provided with electrical heating means indicated at 29, which is adapted to be connected to or disconnected from the trolley 24 by means of a suitable switch, not shown.

In addition, each of the motor cars is provided with electric lights, indicated at 90, and one terminal of these lights is connected to ground, while the other terminal is adapted to be connected to the light wire 36 by means of a switch 91.

The trailer car is provided with lights 190, one terminal of which is connected to ground, and the other terminal of which is adapted to be connected by means of a switch 191 with the portion 136 of the light wire of the trailer car.

When the cars are coupled together into a train as is shown in Fig. 3 of the drawings, the dynamotor 85 on the motor car adjacent one end of the train is connected to the light wire 36, while the dynamotor on the motor car adjacent the other end of the train is connected to the control wire. This distributes the load between the dynamotors on the motor cars as one dynamotor supplies the current required for the lights, while the other supplies the current employed for control purposes.

The diagram illustrated in Fig. 3 of the drawings shows the circuit connections which are established in a train which includes a trailer car and two motor cars. At this time the contacts carried by the couplers on the trailer car, and by the coupler at the rear of the motor car M1 and at the front of the motor car M2 engage, with the result that the control and light wires on these cars are connected together. In addition, the contact 124*f* associated with the switch for the heater unit 129 on the trailer car T1 is connected through the contacts 105*f* and 10*r*, and also through the contacts 110*f* and 5*r*, to the wire 22 on the motor car M1, which is connected to the trolley 24.

Similarly, the contact 124*r* on the trailer car T1 is connected through the contacts 110*r* and 5*f*, and also through the contacts 105*r* and 10*f*, to the wire 22 on the motor car M2, which is connected to the trolley 24 on that car.

The switch blade 123 is arranged so that it will engage either of the contacts 124*r* or 124*f*, and thereby connect the heating element 129 on the trailer car to the trolley on either of the motor cars. The switch blade 123 is also arranged so that it will not engage both of these contacts at the same time, with the result that no circuit can be established between the trolleys on the motor cars through the heating circuit on the trailer car.

At this time the uncoupling valve devices associated with the couplers on the trailer car, with the coupler at the rear of the motor car M1, and with the coupler at the front of the motor car M2, will be in their normal positions in which the supply of fluid under pressure to the slide retracting mechanism and to the coupler releasing mechanism is cut off.

In addition, as these couplers are each connected to another coupler, the valve mechanism in the couplers will operate to supply fluid under pressure to the chambers at the faces of the trigger release pistons therein to permit the contact carrying slides incorporated in the couplers to be projected outwardly into engagement with the slides on the connected couplers.

As fluid under pressure is not supplied by the uncoupling valve devices to the uncoupling mechanism of the couplers at this time, there will be no fluid under pressure supplied to the valve devices 40 and 140 associated with the couplers, and the pistons 44 and 144 thereof will be held in their lower positions, with the result that the double beat valves 55 and 155 incorporated in the valve devices 40 and 140 will be in their lower seated positions to permit communication between chambers 57 and 157 therein and the chambers 53 and 153, respectively.

As the couplers are connected together, the valve mechanism incorporated therein is operated at this time to supply fluid under pressure to the latch or trigger release pistons therein, and fluid from the couplers on the motor cars will also flow to the connected pipes 58 and through these pipes to the chambers 57 in the valve devices 40. This fluid will flow past the double beat valves 55 to the chambers 53 and thence by way of the pipes 54 to the valve means 42 associated with the coupler.

Fluid under pressure supplied through the pipes 54 flows to the chambers 63 and 68 in the valve means 42, and holds the valve pistons 64 against the springs 65 so that the seat ribs 71 engage the sealing gaskets 72 to cut off communication between the passages 69 and the passages 74, while fluid under pressure flows by way of the passages and pipes 76 to the pneumatic switches associated with each of the couplers and holds these switches in their closed positions, thereby completing the circuits controlled thereby.

Similarly, the valve mechanism incorporated in the couplers 101 on the trailer car will supply fluid under pressure to the trigger release pistons therein, and this fluid will flow by way of the pipes 158 to the valve devices 140 and past the double beat valves 155 to the pipes 154 leading to the valve means 142, while fluid flows from these valve means through the pipes 176 to the pneumatic switches 127, 128, 134 and 139.

As a result, therefore, the pneumatic switches controlling the heater circuit, the control circuit and the light circuit on the trailer car, on the rear end of the motor M1, and the forward end of the motor car M2, will be closed to complete these circuits.

At this time the couplers at the forward end of the motor car M1 and at the rear end of the motor car M2 are not connected to any other couplers. As the couplers at these ends of the motor cars M1 and M2 are not connected to other couplers, the valve mechanism in these couplers is not operated to supply fluid under pressure to the trigger release pistons in the couplers, but is operated to connect the chambers at the faces of these pistons to atmosphere.

As a result, therefore, the pipes 58 leading from the trigger release pistons to the valve devices 40 associated with these couplers are connected to atmosphere, while the pistons 44 of these valve devices will be in their lower positions as shown in Fig. 1 of the drawings, at this time as the manual uncoupling valves 2 are in their normal positions.

As the pipes 58 are connected to atmosphere, no fluid under pressure will be supplied through the pipes 54 leading to the valve means 42, and the valve pistons 64 of these valve means will be held by the springs 65 in engagement with the seat ribs 66 and the pneumatic switches associated with the couplers will be connected to atmosphere.

Accordingly, the springs associated with these switches will maintain the movable contacts thereof out of engagement with the stationary contacts associated therewith, and thus interrupt the circuits leading to the contacts carried by these couplers.

As a result, therefore, the contacts 5r, 6r, 7r, 10r, 11r, and 12r at the rear of the motor car M2, and the contacts 5f, 6f, 7f, 10f, 11f and 12f at the front of the motor car M1 will be deenergized.

As these contacts are exposed at this time, it is desirable that they be deenergized to prevent possible injury to workmen or others who might touch them.

When the cars are to be uncoupled the control system provided by this invention operates to cause the pneumatic switches associated with the couplers which are to be separated to be opened before the couplers are released, so that the circuits leading to contacts associated with these couplers are interrupted before the contacts are separated. This prevents arcing and burning, and consequent damage to the contacts.

In order to uncouple the couplers after they are coupled together, the uncoupling valve device associated with either of the couplers is turned from the normal position to the uncoupling position in which fluid under pressure is supplied from the reservoir to the mechanism in the couplers, and to the valve device associated with the coupler.

For purposes of illustration it will be assumed that it is desired to uncouple the motor car M2 from the trailer car T1 in the train shown in Fig. 3 of the drawings, and that the uncoupling valve device 2 on the motor car M2 is turned to the uncoupling position.

On movement of the uncoupling valve 2 to the uncoupling position, fluid under pressure is supplied from the reservoir 81 to the pipe 48 leading to the chamber 45 at the face of the piston 44 of the valve device 40 associated with the coupler at the forward end of the motor car M2. Fluid under pressure is supplied to the chamber 45 at a rapid rate and there is a rapid increase in the pressure of the fluid in this chamber, with the result that the piston 44 is moved upwardly into engagement with the seat rib 52, while force is transmitted through the spring 60 to move the double beat valve 55 upwardly against the spring 59 to the upper seated position, thereby cutting off communication between the chamber 57 to which fluid is supplied from the trigger release piston in the coupler, and the chamber 53 which is connected by way of the pipe 54 with the valve means 42. In addition, on this movement of the double beat valve 55 communication is established between the chamber 53 and the chamber 50, which is constantly connected to the atmosphere by way of the passage 51.

On the release of fluid under pressure from the chamber 53 fluid flows thereto through the pipe 54 from the chamber 63 in the valve means 42, thereby reducing the pressure of the fluid in this chamber and in the chamber 68 at the face of the valve piston 64. On a reduction in the pressure of the fluid in the chambers 63 and 68 fluid flows thereto from the pipe 76 and the chambers in the pneumatic switches 26f, 27f, 34f and 39f, and on a predetermined reduction in the pressure of the fluid in the chamber 68, the force exerted thereby on the valve piston 64 is insufficient to maintain this valve piston against the opposing force of the spring 65.

The valve piston 64 is thereupon moved so that the seat rib 71 thereon is moved away from the sealing gasket 72, thereby permitting fluid under pressure to flow to the chamber at the spring side of the valve piston 64 and causing the valve piston to be moved rapidly into engagement with the seat rib 66, while communication is opened between the passage 69 and the passage 74 to permit the rapid release of fluid under pressure from the pipe 76 to the atmosphere.

The various parts of the equipment are arranged and proportioned so that the spring 65 will move the valve piston 64 downwardly away from the sealing gasket 72 before the pressure of the fluid in the chamber 68, and therefore in the pipe 76, and in the chambers of the pneumatic switches connected thereto, has reduced to a value low enough to permit the springs in the pneumatic switches to move the pistons and the movable contacts associated therewith against the opposing force of the fluid under pressure therein.

The switches, therefore, will be maintained in their closed positions until the valve piston 64 has been moved into engagement with the seat rib 66, and thereafter fluid under pressure is released from the pipe 76 at a rapid rate with the result that the contacts of the pneumatic switches will then be rapidly moved from their closed positions to their open positions.

In addition, on movement of the uncoupling valve device 2 to the uncoupling position, fluid under pressure flows to the pipe 82 and through the check valve 83 to the mechanism in the coupler on the motor car, and also to the mechanism in the coupler on the adjacent end of the trailer car, and actuates the slide retracting mechanism in the couplers to move the contact carrying slides in the electric portions of the couplers away from each other. When these slides are moved substantially to the ends of their range of movement, fluid under pressure is supplied to the releasing mechanism in the couplers to release the couplers and permit the cars to be separated.

As soon as the cars are separated, the valve mechanism in the couplers operates to cut off the supply of fluid under pressure to the trigger release pistons in the couplers, and releases fluid therefrom to permit the triggers to maintain the contact carrying slides in their retracted positions.

As the valve mechanism in the couplers releases fluid under pressure from the trigger release pistons, the supply of fluid under pressure to the valve device 40 associated with the coupler on the motor car, and to the valve device 140 associated with the coupler on the trailer car, is cut off and fluid is released therefrom.

As soon as the cars are separated the uncoupling valve device is returned to the normal position to cut off the supply of fluid under pressure to the mechanism in the coupler, and to the valve device 40.

When the supply of fluid under pressure to the valve device 40 is cut off, the pressure of the fluid in the chamber 45 at the face of the piston 44 is gradually reduced by flow therefrom through the restricted passage 47, and when the pressure of the fluid in this chamber has been reduced to a predetermined relatively low value, the piston 44 is moved downwardly, thereby permitting the spring 59 to move the double beat valve 55 to the lower seated position to cut off communication between the chamber 53 and the chamber 50, and to permit communication between the chamber 57 and the chamber 53.

The chamber at the face of the trigger release piston in the coupler is not supplied with fluid under pressure at this time, but is connected to atmosphere. As a result, when the piston 44 is moved downwardly to permit the double beat valve 55 to move to its lower seated position, no fluid under pressure will be supplied by way of the pipe 58 to the chamber 57, and hence no fluid under pressure will be supplied to the pipe 54 leading to the valve means 42 and to the pneumatic switches. These switches, therefore, will remain in their open positions to interrupt the circuits controlled thereby.

As soon as the cars are separated, the supply of fluid under pressure to the chamber at the face of the trigger release piston incorporated in the coupler on rear end of the trailer car T1 is cut off, and fluid is released therefrom by the valve mechanism incorporated in the coupler. At this time the piston 144 of the valve device 140 associated with the coupler on the trailer car is in its lower position and permits the double beat valve 155 to remain in its lower seated position to permit communication between the chamber at the face of the trigger release piston and the valve means 142.

On the release of fluid under pressure from the chamber at the face of the trigger release piston incorporated in the coupler on the trailer car, therefore, fluid will be released from the valve means 142, and on a predetermined reduction in the pressure of the fluid in the chamber 168 thereof, the valve piston 164 will be moved downwardly by the spring 165 into engagement with the seat rib 166 to permit the rapid release of fluid under pressure from the pipe 176 through the passage 174, and thereby permit the movable contacts of the pneumatic switches 127r, 128r, 134r and 139r to be moved to their open positions and interrupt the circuits through the contacts carried by the coupler at the rear of the trailer car. The contacts carried by this coupler, therefore, will be deenergized at the time that they are exposed, and no injury will result to workmen or others who may touch them.

It will be seen, therefore, that the system operates when the cars are to be uncoupled, to interrupt the circuits through the contacts carried by the couplers before the couplers are separated. It will be seen also that the system operates when the couplers are separated, to maintain the contacts deenergized while the couplers are not connected to other couplers. The contacts are exposed at this time, but as they are deenergized, there is no danger of injury to persons who may touch them.

If the uncoupling valve device 102 associated with the coupler 101 at the rear of the trailer car is turned to the uncoupling position, instead of employing the uncoupling valve device 2 associated with the coupler 1 on the front of the motor car, substantially the same sequence of operations takes place which have been described in detail above, except that the pneumatic switches associated with the coupler on the trailer car will be operated to interrupt the circuits through the contacts carried by the couplers before the couplers are separated, while the pneumatic switches associated with the coupler 1 on the motor car will be opened as soon as the cars are separated.

The control system provided by this invention operates when cars are to be coupled together to maintain the contacts carried by the couplers deenergized until the couplers are firmly engaged, and to thereafter establish the circuits through these contacts.

For purposes of illustration it will be assumed that the motor car M2 is not coupled to the trailer car T1, and that it is desired to couple these cars together.

At this time, as the couplers on these ends of the cars are not connected to other couplers, the pneumatic switches associated with the couplers will be in their open positions, as discussed in detail above.

In order to couple the cars together the cars are pushed together, and the couplers engage and align themselves. On movement of the couplers together, the stationary and movable contacts carried by the couplers engage, and the movable contacts 120 may be moved back slightly against the springs associated therewith so that they firmly engage the stationary contacts carried by the other couplers.

When the couplers are pressed firmly into engagement with each other, the valve mechanism in the couplers is operated to supply fluid under pressure to the trigger release pistons incorporated in the couplers to actuate these pistons to release the contact carrying slides and permit them to be projected into engagement with each other.

At this time the pistons 44 and 144 and the valve devices 40 and 140 associated with the couplers on the motor and trailer cars are in the positions in which they are shown in Fig. 1 of the drawings so as to permit the double beat valves 55 and 155 to be in their lower seated positions.

On the supply of fluid under pressure to the trigger release pistons incorporated in the couplers, fluid under pressure flows to the valve devices 40 and 140 and therefrom by way of the pipes 54 and 154 to the valve means 42 and 142, respectively.

On a predetermined increase in the pressure of the fluid supplied to these valve means, the valve pistons 64 and 164 are moved upwardly against the springs 65 and 165 to permit the supply of fluid under pressure to the pneumatic switches associated with the couplers, which are thereupon operated to complete the circuits controlled thereby, and to maintain them as long as the couplers remain coupled together and the uncoupling valve devices remain in their normal positions.

It will be seen, therefore, that the circuits through the contacts associated with the couplers are not completed until the couplers are firmly pressed together, and the contacts carried thereby firmly engaged, and that these circuits are thereafter automatically completed. There will, therefore, be no arcing or burning of these contacts when the couplers are brought together.

While one embodiment of the improved control system provided by this invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a car coupling equipment, a coupler having a contact associated therewith and operative to engage a contact on a connected coupler, a switch device comprising a body having a chamber therein, a movable abutment subject to fluid pressure established by supply of fluid to said chamber, and a switch operated by said abutment on the supply of fluid under pressure to said chamber to establish a circuit through said contact, the coupler incorporating a valve device operative only when the coupler is connected to another coupler to supply fluid under pressure to the chamber, the coupler also incorporating release means operative on the supply of fluid under pressure to release the coupler, manually operated valve means for supplying fluid to said release means, and means subject to the fluid supplied to the release means for controlling the supply of fluid to said chamber by said valve device.

2. In a car coupling equipment, a coupler having a contact associated therewith and operative to engage a contact associated with a connected coupler, a switch device comprising a body having a chamber therein, a movable abutment subject to fluid pressure established by supply of fluid to said chamber, and a switch operated by said abutment on the supply of fluid under pressure to said chamber to establish a circuit through said contact, the coupler incorporating a valve device operative only when the coupler is connected to another coupler to supply fluid under pressure to said chamber, the coupler also incorporating release means operative on the supply of fluid under pressure to release the coupler, manual means for supplying fluid under pressure to said release means, and means responsive to the pressure of the fluid supplied to said release means for controlling the supply of fluid under pressure by said valve device to said chamber and for releasing fluid from said chamber.

3. In a car coupling equipment, a coupler having a contact associated therewith and operative to engage a contact associated with a connected coupler, a switch device comprising a body having a chamber therein, a movable abutment subject to fluid pressure established by supply of fluid to said chamber, and a switch operated by said abutment on the supply of fluid under pressure to said chamber to establish a circuit through said contact, the coupler incorporating a valve device operative only when the coupler is connected to another coupler to supply fluid under pressure to said chamber, the coupler also incorporating release means operative on the supply of fluid under pressure to release the coupler, manual means for supplying fluid under pressure to said release means, and means controlled by said manual means for controlling the supply of fluid by said valve device to said chamber and for releasing fluid from said chamber.

4. In a car coupling equipment, in combination, a coupler having a contact associated therewith and operative to engage a contact associated with a connected coupler, a switch device comprising a body having a chamber therein, a movable abutment subject to fluid pressure established by supply of fluid to said chamber, and a switch operated by said abutment on the supply of fluid under pressure to said chamber to establish a circuit through said contact, the coupler incorporating a valve device operative to supply fluid under pressure only when the coupler is connected to another coupler, valve means subject to the pressure of the fluid supplied by said valve device, said valve means being operative to release fluid from said chamber and to prevent the supply of fluid thereto until the pressure of the fluid supplied by said valve device increases to a predetermined value and to thereafter permit fluid to be supplied by said valve device to said chamber, the coupler also incorporating release means operative on the supply of fluid under pressure to release the couplers, manual means for supplying fluid under pressure to the release means, and means responsive to the pressure of the fluid supplied to the release means for controlling the supply of fluid from the valve device to said valve means and for releasing fluid from said valve means.

5. In a car coupling system, couplers adapted to be coupled together, each of said couplers having a contact associated therewith and adapted to engage the contact on the other coupler when the couplers are coupled together, each of said couplers having a switch device associated therewith, each of said switch devices comprising a body having a chamber therein, a movable abutment subject to fluid pressure established by supply of fluid to said chamber, and a switch operative by said abutment on the supply of fluid under pressure to said chamber to establish a circuit through the contact associated with said coupler, each of the couplers having a valve device associated therewith and operative to supply fluid to the chamber of the switch device associated with the coupler only when the coupler is connected to another coupler, each of the couplers having release means associated therewith and operative on the supply of fluid under pressure to release the coupler, each of the couplers having control means associated therewith and responsive to the pressure of the fluid supplied to the release means for controlling the supply of fluid by the valve device associated with the coupler to the chamber of the switch device associated therewith, said couplers each having associated therewith manual means operable when the coupler is coupled to another coupler to supply fluid under pressure to the release means in each of the couplers and to the control means on one of said couplers.

6. In circuit control means adapted to control the circuit to a contact associated with a coupler of a type having an electric portion having a movable slide, a movable abutment operated by fluid pressure established on the supply of fluid under pressure to effect movement of the movable slide towards the slide on a connected coupler, the coupler incorporating means operative only when the coupler is coupled to another coupler for supplying fluid under pressure to said movable abutment, said coupler also incorporating uncoupling means operative on the supply of fluid under pressure to release the coupler, and manual means for supplying fluid under pressure to said uncoupling means, the control means comprising a switch device comprising a body having a chamber therein, a movable member subject to fluid pressure established by supply of fluid to said chamber, and a switch operated by said member on the supply of fluid under pressure to said chamber to establish said circuit, and means controlled by the supply of fluid to the uncoupling means for supplying fluid from the said movable abutment to said switch device chamber.

7. In circuit control means adapted to control the circuit to a contact associated with a coupler of a type having an electric portion having a movable slide, a movable abutment operated by fluid pressure established on the supply of fluid under pressure to effect movement of the movable slide towards the slide on a connected coupler, the coupler incorporating means operative only when the coupler is coupled to another coupler for supplying fluid under pressure to said movable abutment, said coupler also incorporating uncoupling means operative on the supply of fluid under pressure to release the coupler, and manual means for supplying fluid under pressure to said uncoupling means, the control means comprising a switch device comprising a body having a chamber therein, a movable member subject to fluid pressure established by supply of fluid to said chamber, and a switch operated by said member on the supply of fluid under pressure to said chamber to establish said circuit, and means controlled by said manual means for supplying fluid under pressure from said movable abutment to said switch device chamber.

8. In a car coupling equipment, a coupler having a contact associated therewith adapted to engage a contact on a connected coupler, a switch device comprising a body having a chamber therein, a movable abutment subject to the pressure of the fluid in said chamber, and a switch operated by said abutment upon the supply of fluid under pressure to said chamber for supplying current to said contact, and means operable only when the coupler is connected to another coupler for supplying fluid under pressure to said chamber, said means being automatically operated when the coupler is coupled to another to supply fluid under pressure to a communication through which fluid under pressure may be supplied to said chamber.

9. In a car coupling equipment, a coupler having a contact associated therewith adapted to engage a contact on a connected coupler, a switch device comprising a body having a chamber therein, a movable abutment subject to the pressure of the fluid in said chamber, and a switch operated by said abutment on the supply of fluid under pressure to said chamber to establish a circuit through said contact, the coupler incorporating a valve device operative only when the coupler is connected to another coupler to supply fluid under pressure to the chamber, the coupler also incorporating release means operative on the supply of fluid under pressure to release the coupler, manually operated valve means for supplying fluid to said release means, and means subject to the fluid supplied to the release means for controlling the supply of fluid to said switch device chamber by said valve device, said valve device being automatically operated when the coupler is coupled to another to supply fluid under pressure to a communication through which fluid may be supplied to said switch device chamber.

ROY R. STEVENS.